(No Model.)

L. WOLF.
CULTIVATOR AND SEED PLANTER.

No. 452,822. Patented May 26, 1891.

WITNESSES
Jno. G. Hinkel
A. M. Hamilton

Lorenz Wolf
INVENTOR
by Charles Wm. B. King
Attorneys.

UNITED STATES PATENT OFFICE.

LORENZ WOLF, OF SPIELERVILLE, ARKANSAS.

CULTIVATOR AND SEED-PLANTER.

SPECIFICATION forming part of Letters Patent No. 452,822, dated May 26, 1891.

Application filed October 22, 1890. Serial No. 368,916. (No model.)

*To all whom it may concern:*

Be it known that I, LORENZ WOLF, a citizen of the United States, residing at Spielerville, in the county of Logan and State of Arkansas, have invented certain new and useful Improvements in Cultivating and Seed-Planting Machines; and I do hereby declare the following to be a full, clear, and exact description of the invention, such as will enable others skilled in the art to which it appertains to make and use the same.

My invention has for its object to produce a combined cultivating and seed-planting machine which shall thoroughly cultivate or loosen the soil, form the hill or ridge, deposit the seed, and cover the same; and it consists of a machine adapted to perform these functions and constructed as hereinafter pointed out.

Figure 1:
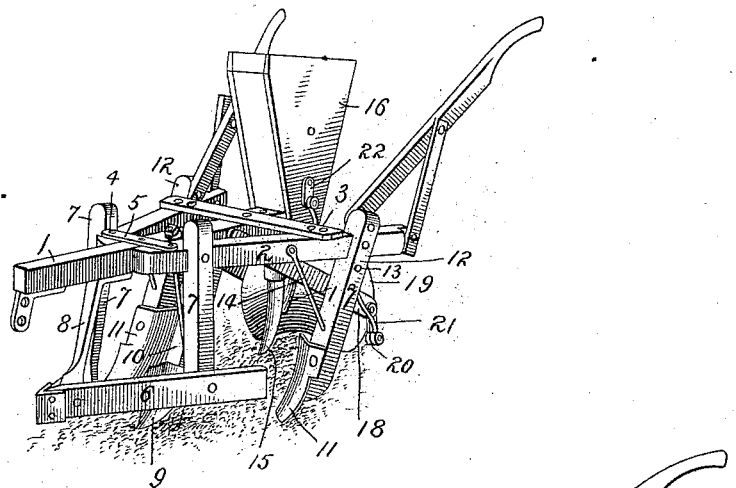
Figure 3:
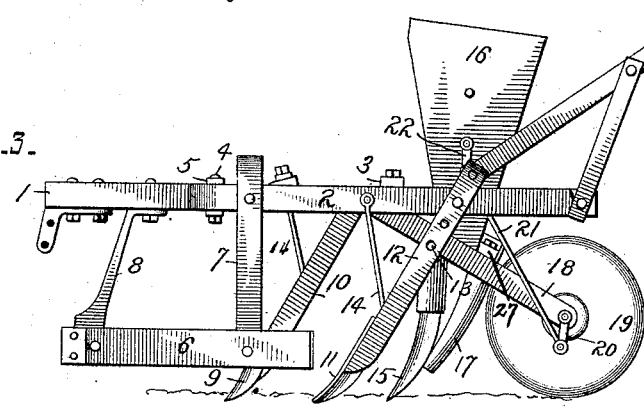
Figure 2:
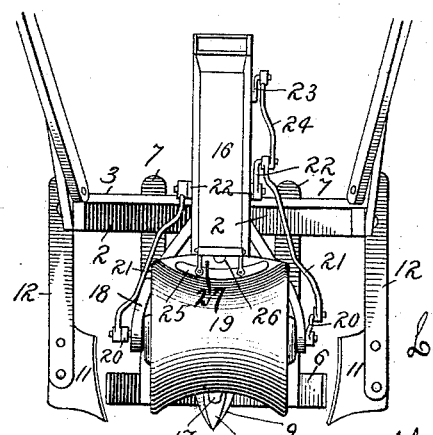

In the drawings, Figure 1 is a perspective view of a cultivator and seeder embodying my invention. Fig. 2 is a rear view, and Fig. 3 is a side view, thereof.

My invention is particularly intended for and adapted to the planting of cotton-seeds; but it may also be adapted to and used upon machines intended for planting other seeds.

In the drawings, 1 represents the main central beam, to the forward end of which the draft devices are attached, and 2 2 the side beams, which are pivotally secured at their forward ends to the central beam, being held by bolts 4 between cross-plates 5, so that the rear ends of these beams may be swung toward or from the central beam. In practice the side beams 2 2 diverge toward the rear, and are held apart in suitable positions by a cross-beam 3, bolted to the central beam and provided with means for holding the side beams in the various positions to which they may be adjusted.

6 is a V-shaped scraper supported at the front end of the planter upon posts 7 7 and 8, depending, respectively, from the two side beams and the central beam.

A little in rear of the point of the scraper and midway between the sides or wings thereof is a shovel-plow 9, supported at the lower end of a standard 10, carried by the central beam 1.

11 11 are right and left shovel or hilling plows arranged in rear of the sides or wings of the scraper. The standards 12, which carry the hilling-plows, are each provided with a series of holes 13, through any one of which may be passed the bolt which secures the standard to the side beam. The standards 10 and 12 are braced by the rods 14.

Situated directly in rear of the plow 9 and behind the hilling-plows 11 is the opener 15, which forms a channel in the mound or ridge of earth formed by the plows 11, into which are dropped the seeds, which are conducted from the hopper 16 through a tube or channel 17 in rear of the opener 15. The seed-hopper is supported upon a frame free to swing vertically, composed of two bars or arms 18 and a cross-bar 27, hinged to the central beam 1 and having mounted at its rear the covering-roller 19.

On each end of the roller-shaft is a crank-arm 20, which is connected by a link 21 with a crank-arm 22 on the feeding-wheel situated in the feed-hopper. Above the feeding-wheel in the hopper is a stirring-wheel, the shaft of which is provided on one side with a crank 23, connected with the crank 22 by a link 24. This arrangement of feeding and stirring wheels and connecting devices insures that the seed shall be properly fed so long as the machine is being propelled, as the covering-wheel 19, pressed upon the ground by gravity, follows any irregularities which may be in the ridge thrown up by the plows 11, and thus is caused to revolve and both cover the seed and operate the agitating and dropping mechanism.

25 is a scraper-blade arranged with its edge close to the surface of the roller and operating to keep the latter free from soil which may tend to stick thereto.

26 is a slide in the bottom of the feed-hopper, arranged over the opening to the tube 17 to regulate the rate at which the seed shall be fed.

When the machine is in operation, the scraper 6 clears and evens the ground, tearing up the weeds and grass which may be in the way of the planting. The central plow 9 follows the scraper and pulverizes the soil along the path in which the seed is to be dropped, and the side plows 11 throw up the soil from the sides over the furrow made by the plow 9 and form a ridge of earth. A channel in this ridge is opened by the opener 15, and the seeds are dropped from the hopper into this channel and covered by the roller 10, which is so shaped as to also properly shape the surface of the ridge.

The machine which I have described is simple in construction and effective in operation and may be used upon ground which has not been cultivated previously to the cultivation which it receives from the use of my machine.

What I claim is—

In a seed-planter, the combination of the scraper 6 at the front of the planter, the central plow 9 in rear of the scraper, the hilling-plows 11, arranged outside of and in rear of the plow 9, the opener 15, in line with the plow 9 and in rear of the plows 11, the frame in rear of the opener, hinged to the main frame-work of the planter and free to swing vertically, the seed-hopper mounted on such frame, the covering-wheel also mounted in such frame, and the connecting mechanism between the shaft of the roller and the seed-dropping devices in the hopper, the swinging frame, seed-hopper, covering-roller, and connecting mechanism being arranged to all rise and fall together as the roller passes over uneven places in the soil, substantially as described.

In testimony whereof I affix my signature in presence of two witnesses.

LORENZ WOLF.

Witnesses:
DOMINICK STIEPVATER,
R. G. ROESLEIN.